US007394587B2

(12) United States Patent
Etheridge, III et al.

(10) Patent No.: US 7,394,587 B2
(45) Date of Patent: Jul. 1, 2008

(54) APPARATUS HAVING A PHOTONIC CRYSTAL

(75) Inventors: Herbert Thomas Etheridge, III, Corvallis, OR (US); Henry Lewis, Corvallis, OR (US); Carol McConica, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 603 days.

(21) Appl. No.: 11/046,587

(22) Filed: Jan. 28, 2005

(65) Prior Publication Data

US 2006/0170334 A1 Aug. 3, 2006

(51) Int. Cl.
*G02B 13/00* (2006.01)

(52) U.S. Cl. ......................... 359/321; 359/238; 359/240

(58) Field of Classification Search ................. 359/321, 359/237, 238, 240, 245, 252
See application file for complete search history.

(56) References Cited

U.S. PATENT DOCUMENTS

| | | | | |
|---|---|---|---|---|
| 4,959,585 | A * | 9/1990 | Hoegler et al. | 313/271 |
| 6,768,256 | B1 | 7/2004 | Fleming | |
| 6,829,421 | B2 | 12/2004 | Forbes | |
| 6,845,204 | B1 | 1/2005 | Broeng | |
| 6,875,303 | B2 * | 4/2005 | Samurkas et al. | 156/272.6 |
| 2003/0231397 | A1 | 12/2003 | Shirane | |
| 2004/0016936 | A1 * | 1/2004 | Tanaka et al. | 257/98 |

FOREIGN PATENT DOCUMENTS

| | | | |
|---|---|---|---|
| JP | 2004-145145 | * | 5/2004 |
| WO | WO 2004/049764 | | 6/2004 |

OTHER PUBLICATIONS

Lin, Shawn et al; "Silicon Three-dimensional Photonic Crystal and its Applications"; Sandia National Laboratories; Nov. 2001; Sandia Report, USA; 29 pages.

Moon; Fabrication of Ordered Macroporous Cylinders by Colloidal Templating in Microcapillaries; Langmuir 2004, vol. 20, No. 5, p. 2033-2035.

Wong; Colloidal Crystal Films: Advances in University and Perfection; JACS Articles 2003, vol. 125, No. 50, p. 15589-15598.

Jiang; Single-Crystal Colloidal Multilayers of Controlled Thickness; Chem.Mater. 1999, vol. 11, No. 8, p. 2132-2140.

King; High-filling-fraction inverted ZnS opals fabricated by atomic layer deposition; Applied Physics Letters, Sep. 29, 2003, vol. 83, No. 13, p. 2566-2568.

Romanov; Enhancement of the photonic gap of opal-based three-dimensional gratings; Applied Physics Letters, Apr. 21, 1997, vol. 70, No. 16, p. 2091-2093.

(Continued)

*Primary Examiner*—Timothy Thompson

(57) ABSTRACT

An apparatus, including a substrate, having an internal surface where at least a portion of the internal surface has a smoothly varying curvature in three orthogonal directions. The apparatus also includes a photonic crystal disposed over and conformal to at least a portion of the internal surface having the smoothly varying curvature.

49 Claims, 7 Drawing Sheets

OTHER PUBLICATIONS vonFreymann; Tungsten inverse opals:The influence of absorption on the photonic band structure in the visible spectral reg.; Appl. Phys Ltrs, Jan. 12, 2004, vol. 84,No. 12, p. 224-226.

Rugge; Tungsten Nitride Inverse Opals by Atomic Layer Deposition; Nano Letters, 2003, vol. 3, No. 9, p. 1293-1297.

Klaus; Atomic layer deposition of tungsten using sequential surface chemistry with a sacrificial stripping reaction; Thin Solid Films 360, 2000, p. 145-153.

Crowell; Chemical methods of thin film deposition: Chemical vapor deposition, atomic layer deposition, and related technologies; JVST, Sep./Oct. 2003, vol. 21, No. 5, p. S88-S95.

* cited by examiner

APPARATUS HAVING A PHOTONIC CRYSTAL

CROSS-REFERENCE TO RELATED APPLICATION

This application is related to commonly assigned application Ser. No. 11/046,586, now U.S. Pat. No. 7,085,038, filed on the same day herewith by Herbert T. Etheridge III, Henry D. Lewis and Carol M. McConica and entitled "Apparatus Having a Photonic Crystal."

BACKGROUND

Description of the Art

As the demand for cheaper and higher performance electronic devices continues to increase there is a growing need to develop higher yielding and lower cost manufacturing processes for electronic devices especially in the area of optical devices. In particular there is a demand for higher performance as well as improved efficiency in lighting technology.

Although incandescent lamps are inexpensive and the most widely utilized lighting technology in use today, they are also the most inefficient lighting source in regards to the amount of light generated per unit of energy consumed. An incandescent lamp works by heating a filament, typically tungsten, to a very high temperature so that it radiates in the visible portion of the electromagnetic spectrum. Unfortunately, at such high temperatures the filament radiates a considerable amount of energy in the non-visible infrared region of the electromagnetic spectrum.

If these problems persist, the continued growth and advancements in the use of opto-electronic devices, especially in the area of photonic crystals, in various electronic products, will be reduced. In areas like consumer electronics, the demand for cheaper, smaller, more reliable, and higher performance electronics constantly puts pressure on improving and optimizing performance of ever more complex and integrated devices. The ability to optimize lighting performance efficiency will open up a wide variety of applications that are currently either impractical, or are not cost effective.

DESCRIPTION OF THE PREFERRED EMBODIMENTS

This invention is directed to various photonic structures utilizing colloidal crystals. The present invention includes a wide variety of photonic structures formed on, over or both on and over internal curved surfaces including, for example, on the internal surface of a bulb-like structure. Photonic crystals, typically, are spatially periodic structures having useful electromagnetic wave properties, such as photonic band gaps. Photonic crystals, for example, having the proper lattice spacing, offer the potential of improving the luminous efficacy of an incandescent lamp by modifying the emissivity of the metal filament. Such a filament, incorporated into a photonic crystal or encircled or surrounded by a photonic crystal, would emit a substantial fraction of its radiation in the visible portion of the spectrum and little or no light in the non-visible portions such as the infrared portion of the electromagnetic spectrum. Since many filaments, including spirally wound filaments, utilized as incandescent sources are encased, enclosed or some combination thereof in glass the ability to form photonic crystals on internal curved surfaces provides for simpler manufacturing processes to make incandescent light sources, having a lower cost, and/or a higher luminous efficiency.

It should be noted that the drawings are not true to scale. Further, various elements have not been drawn to scale. Certain dimensions have been exaggerated in relation to other dimensions in order to provide a clearer illustration and understanding of the present invention. In particular, vertical and horizontal scales may differ and may vary from one drawing to another. In addition, although some of the embodiments illustrated herein are shown in two dimensional views with various regions having height and width, it should be clearly understood that these regions are illustrations of only a portion of a device that is actually a three dimensional structure. Accordingly, these regions will have three dimensions, including length, width, and height, when fabricated on an actual device.

Moreover, while the present invention is illustrated by various embodiments, it is not intended that these illustrations be a limitation on the scope or applicability of the present invention. Further, it is not intended that the embodiments of the present invention be limited to the physical structures illustrated. These structures are included to demonstrate the utility and application of the present invention to presently preferred embodiments.

Figure 1:
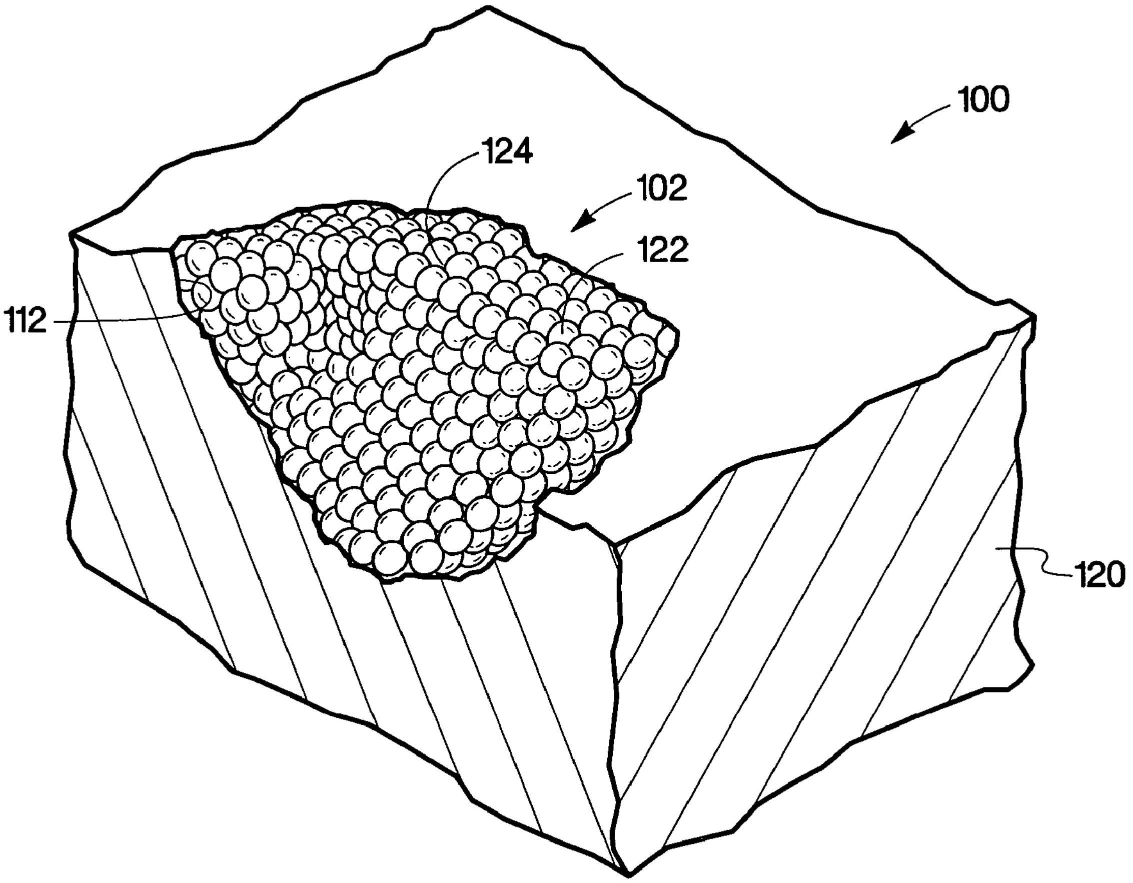
FIG. 1 is a perspective view of a portion of a substrate having spheres disposed thereon according to an embodiment of the present invention.

An embodiment of apparatus 100 employing the present invention is illustrated in a perspective view, in FIG. 1. In this embodiment, apparatus 100 includes substrate 120 that includes internal surface 112 that includes at least a portion having a smoothly varying curvature in three orthogonal directions. Apparatus 100 also includes photonic crystal 102 disposed over and is conformal to at least a portion of internal surface 112, as illustrated in the perspective view in FIG. 1. In this embodiment, spheres 122 may be disposed on any internal surface of a substrate having essentially a three-dimensional quadric or greater surface such as a depression formed in a substrate or a bowl-like surface formed in or created by a substrate. Here a quadric surface is considered not to include a cylinder. Examples of such internal surface structures include, but are not limiting as to the nature of the present invention, spherically shaped, hemispherically shaped, parabolically shaped, conically shaped, elliptically shaped, and hyperbolically shaped substrates. Essentially any substrate with an internal surface having a smoothly varying curvature in three orthogonal directions may be utilized in this embodiment. In still other embodiments, various layers such as an adhesive layer or other layer having particular optical or dielectric properties may be disposed between substrate 120 and photonic crystal 102. Photonic crystal 102, as illustrated in FIG. 1 is what is commonly referred to as a colloidal crystal or opaline crystalline array. The colloidal crystal is formed utilizing spheres 122. In alternate embodiments, photonic crystal 102 may also form what is commonly referred to as an inverse opal structure where interstitial volume 124 between the spheres is infiltrated and filled with a second material with optional subsequent removal of spheres 122. Typically, the optional removal of the spheres after infiltration is completed will depend on whether the interstitial material has a higher refractive index than the spheres. In those cases where it is higher then the spheres need not, but may be removed. Generally, photonic crystal 102 will be formed utilizing multiple layers of spheres having typically a close-packed geometry, as illustrated FIG. 1, forming a face centered cubic crystalline structure (FCC), a hexagonal close packed structure (HCP), or other randomly stacked polycrystalline structure with each sphere predominantly touching six other spheres in one layer. However, in alternate embodiments other structures also may be utilized including, for example, simple cubic, body centered cubic and tetragonal packing. Further, in some embodiments, a single layer of spheres may be desirable. In those embodiments, utilizing multiple layers photonic crystal 102 may also form a photonic band gap crystal. Substrate 120, in this embodiment, may be formed from any material that has the desired optical, chemical, physical, and mechanical properties for utilization in apparatus 100. For example, in one embodiment, substrate 120 may be formed from various glasses for those applications desiring substantial transparency in the visible portion of the electromagnetic spectrum. In another embodiment, substrate 120 may be formed utilizing a plastic, metal, or ceramic substrate. The particular material chosen will depend on various factors such as on the particular portion of the spectrum to be utilized by the photonic crystal, the desired intensity the material may be subjected to, and whether the crystal is utilized in a substantially transmissive or reflective mode or some combination thereof. For example, either a ceramic substrate or a cermet substrate coated with a reflective metal film, or a reflective metal substrate, may be utilized in those applications where the photonic crystal is utilized predominantly as a reflector. Spheres 122, in this embodiment, may be formed from any material that is formable into spheres and provides the desired dielectric constant for the particular application in which the photonic crystal is utilized. The size of the spheres generally ranges from a few microns in diameter to a few nanometers in diameter. Both the particular material utilized to form spheres 122 and the size of the spheres will depend on the particular optical properties of the photonic crystal utilized in apparatus 100. For example, silica, metal, or polymeric spheres formed on the internal surface of a glass bulb may be utilized in those applications desiring a reduction in the infrared portion of the electromagnetic spectrum emitted from a high temperature filament located inside the glass bulb. Still another example is to use spheres having a differential solubility over an infiltration material to form inverse opal structures such as silica spheres removed by hydrofluoric acid in a tungsten inverse opal structure. Further, the photonic crystal may be formed utilizing spheres having different sizes. A wide variety of combinations of different sphere sizes may be used in the present invention. For example, each successive layer of spheres may increase or decrease in size, or the size of spheres may alternate in successive layers or every nth layer may vary or an alternating group of layers may be varied. In addition, spheres of different sizes also may be utilized to form a single layer such as in the formation of a binary ($AB_2$) colloidal crystal.

Figure 2:
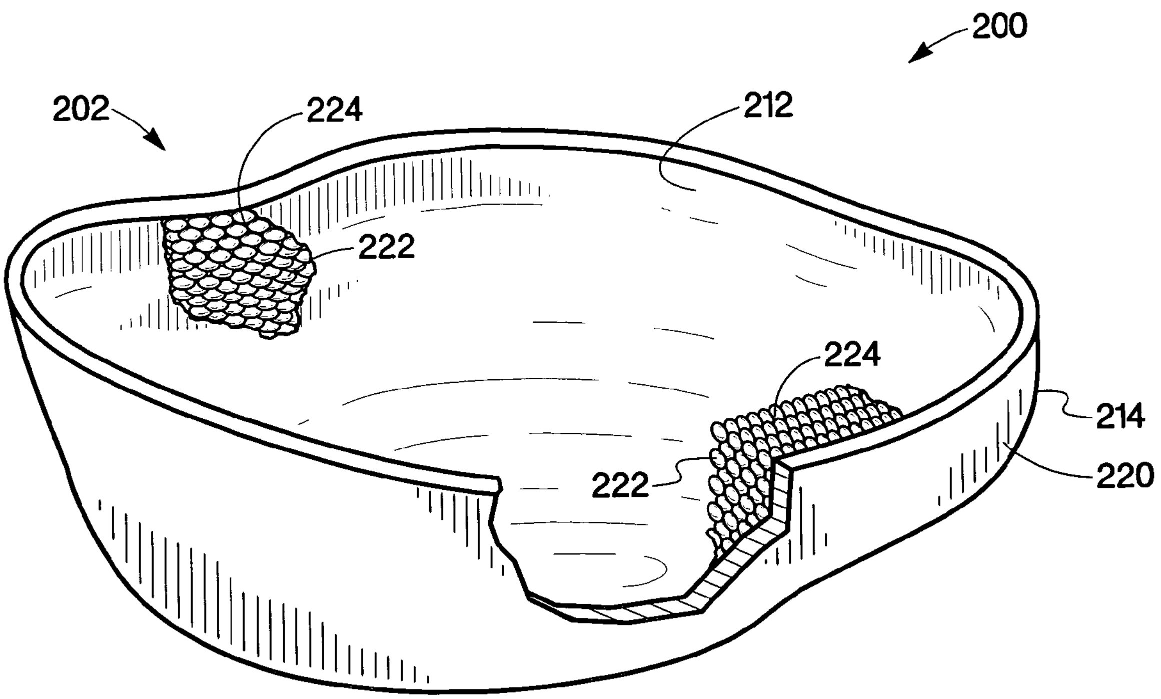
FIG. 2 is a perspective view of a colloidal crystal formed on a three-dimensional quadric surface according to an alternate embodiment of the present invention.

An alternate embodiment of an apparatus employing the present invention is illustrated in a perspective view, in FIG. 2. In this embodiment, apparatus 200 includes substrate 220 that includes internal surface 212 having a smoothly varying curvature in three orthogonal directions. Essentially any substrate with an internal surface having a smoothly varying curvature in three orthogonal directions and an external surface also having a smoothly varying curvature in three orthogonal directions, whether conformal or not to the internal may be utilized in this embodiment including substrates having a three-dimensional quadric or greater surface. Substrate 220 also includes external surface 214 that is substantially opposed to internal surface 212. In addition, apparatus 200 also includes photonic crystal 202 disposed over and conformal to at least a portion of internal surface 212, as illustrated in the perspective view along in FIG. 2. In this embodiment, spheres 222 may be disposed on any internal surface having a smoothly varying curvature in three orthogonal directions or bowl-like surface. Although the following structures are not meant to be limiting as to the nature of the present invention, examples of such internal surface structures include, spherically shaped, hemispherically shaped, parabolically shaped, conically shaped, elliptically shaped, and hyperbolically shaped substrates. In still other embodiments, various layers such as an adhesive layer or other layer having particular optical or dielectric properties may be disposed between substrate 220 and photonic crystal 202. Photonic crystal 202, as illustrated in FIG. 2, as previously described is what is commonly referred to as a colloidal crystal or opaline crystalline array formed utilizing spheres 222. In alternate embodiments, photonic crystal 202 may also form what is commonly referred to as an inverse opal structure as previously described above where a second material is infiltrated into interstitial volume 224 between the spheres with optional subsequent removal of the spheres.

Generally, photonic crystal 202 will be formed utilizing multiple layers of spheres having typically a close-packed geometry, as illustrated FIG. 2, forming a face centered cubic crystalline structure (FCC), a hexagonal close packed structure (HCP), or other randomly stacked polycrystalline structure with each sphere predominantly touching six other spheres in one layer. However, in alternate embodiments other structures also may be utilized including, for example, simple cubic, body centered cubic and tetragonal packing. Further, in some embodiments, a single layer of spheres may be desirable. In those embodiments, utilizing multiple layers photonic crystal 202 may also form a photonic band gap crystal. Substrate 220, in this embodiment, may be formed from any material that has the desired optical, chemical, physical, and mechanical properties for utilization in apparatus 200. Spheres 222, in this embodiment, may be formed from any material that is formable into spheres and provides the desired dielectric constant for the particular application in which the photonic crystal is utilized. The size of the spheres generally ranges from a few microns in diameter to a few nanometers in diameter. Both the particular material utilized to form spheres 222 and the size of the spheres will depend on the particular optical properties of photonic crystal 202 utilized in apparatus 200. For example, silica, metal, or polymeric spheres formed on the internal surface of a glass bulb may be utilized in those applications desiring a reduction in the infrared portion of the electromagnetic spectrum emitted from a high temperature filament located inside the glass bulb. Still another example is to use spheres having a differential solubility over an infiltration material to form inverse opal structures such as silica spheres removed by hydrofluoric acid in a tungsten inverse opal structure. Further, the photonic crystal may be formed utilizing spheres having different sizes. A wide variety of combinations of different sphere sizes may be used in the present invention. For example, each successive layer of spheres may increase or decrease in size, or the size of spheres may alternate in successive layers or every nth layer may vary or an alternating group of layers may be varied. In addition, spheres of different sizes also may be utilized to form a single layer such as in the formation of a binary ($AB_2$) colloidal crystal.

Figure 3A:
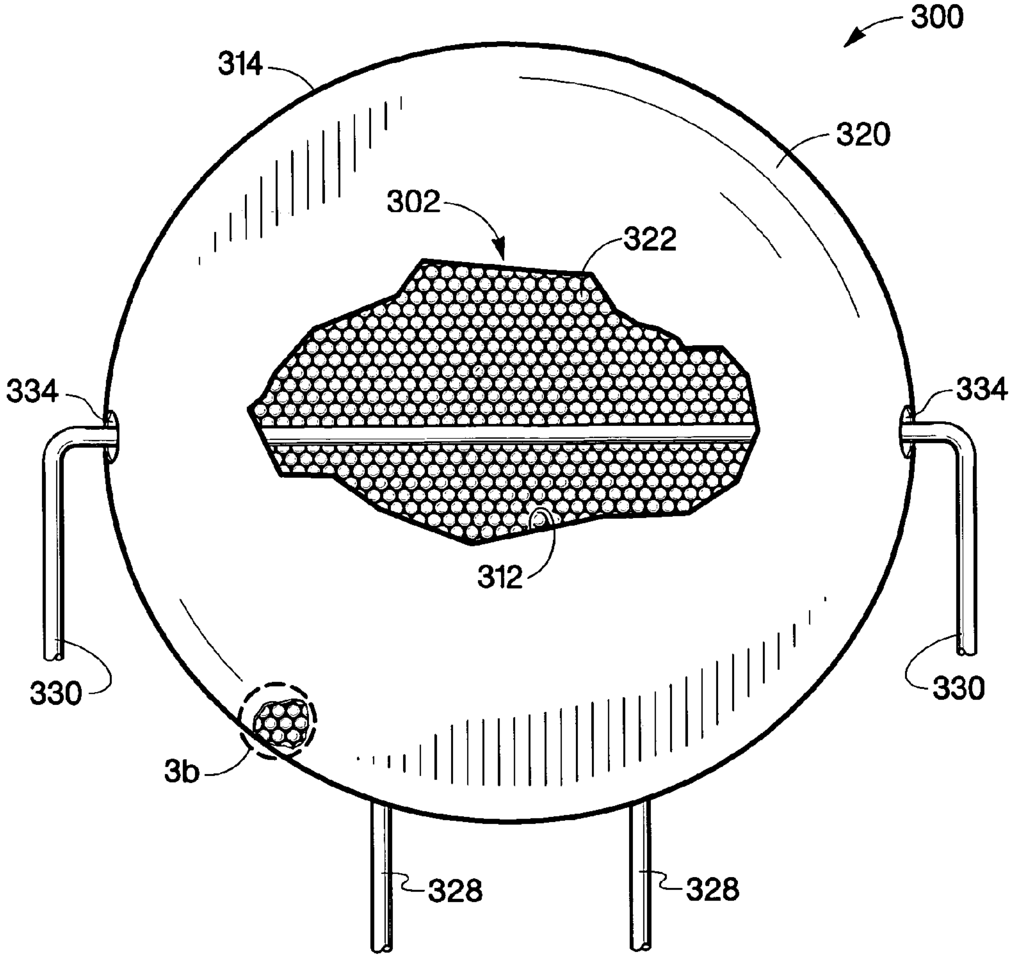
FIG. 3*a* is a perspective view of a colloidal crystal formed on the inner surface of a spherically shaped substrate according to an alternate embodiment of the present invention.
Figure 3B:
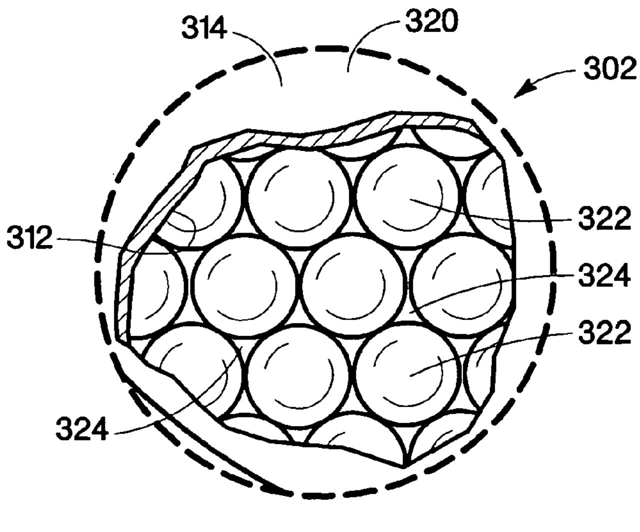
FIG. 3*b* is an expanded perspective view of a portion of the colloidal crystal shown in FIG. 3*a*.

An alternate embodiment of the present invention is shown in a perspective view in FIG. 3*a*. In this embodiment, apparatus 300 includes substrate 320 having generally a spherically shaped structure. However, in alternate embodiments, substrate 320 may have any curved shape forming essentially a closed-surface-like structure. Substrate 320 also includes substrate supports 328 to facilitate mounting of substrate 320 to a substrate holder (not shown). In addition, substrate 320 includes multiple layers of spheres 322 disposed on internal surface 312 of substrate 320 as illustrated in FIG. 3*a*. In an alternate embodiment, the spheres also may be disposed on external surface 314 of substrate 320. In the embodiment shown in FIG. 3, the spheres form photonic crystal 302; however, in alternate embodiments, photonic crystal 302 may be formed utilizing an inverse opal structure where a second material is infiltrated into interstitial volume 324 (see expanded view in FIG. 3*b*) between the spheres as previously described. In still other embodiments, various layers such as an adhesive layer or other layer having particular optical or dielectric properties, or combinations thereof may be disposed between substrate 320 and photonic crystal 302. In this embodiment, photonic crystal 302 is a colloidal crystal tuned to yield a band gap in a desired spectral region. For example, a band gap tuned to transmit radiation in the visible region of the electromagnetic spectrum may be utilized to increase the efficiency of an incandescent light source when filament 330 is heated. In this embodiment, filament 330 is substantially enclosed within substrate 320. Filament 330 extends through filament openings 334 so that electrical connections to filament 330 are facilitated. However, it should be appreciated that a wide range of filament types, a non-limitative example is a spirally wound filament, and a wide range of connector geometries, a non-limitative example is a filament bent at right angles outside the substrate. In addition, substrate supports 328 also may be utilized to facilitate alignment of the photonic crystal to filament 330.

Figure 4A:
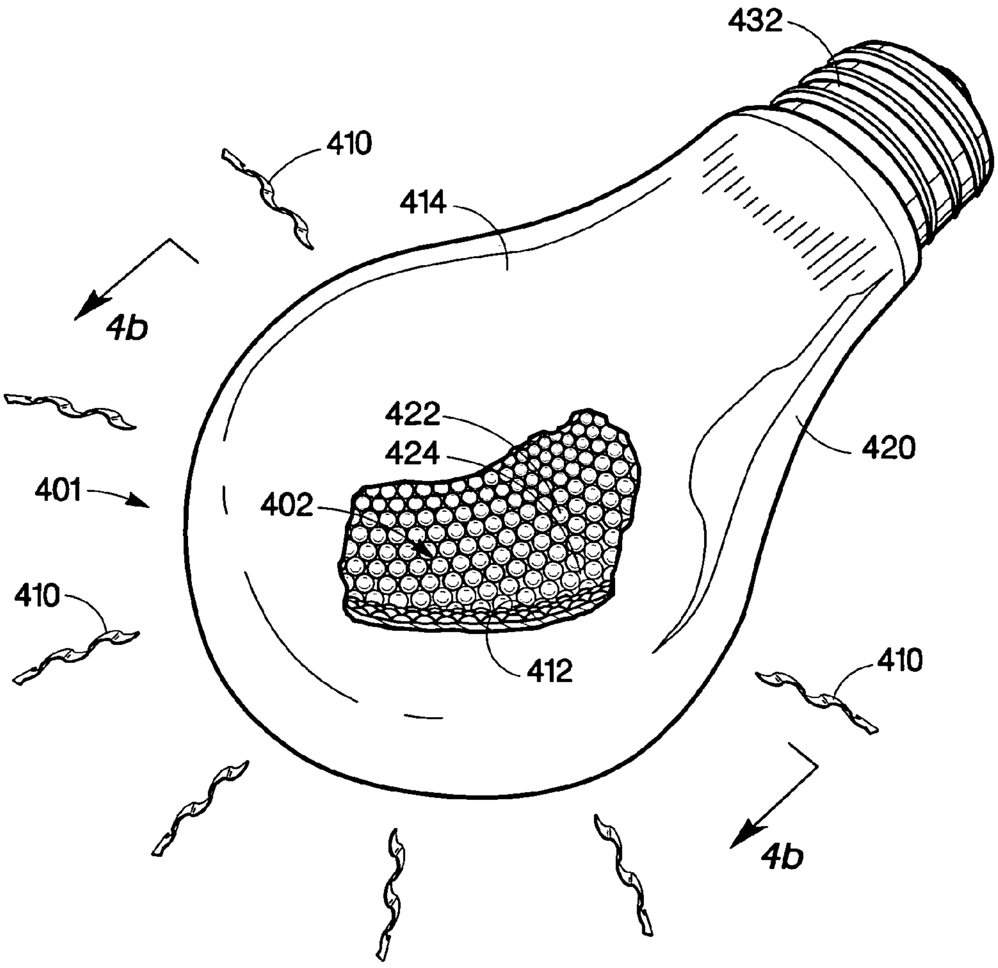
FIG. 4*a* is a perspective view of an incandescent source according to an alternate embodiment of the present invention.
Figure 4B:
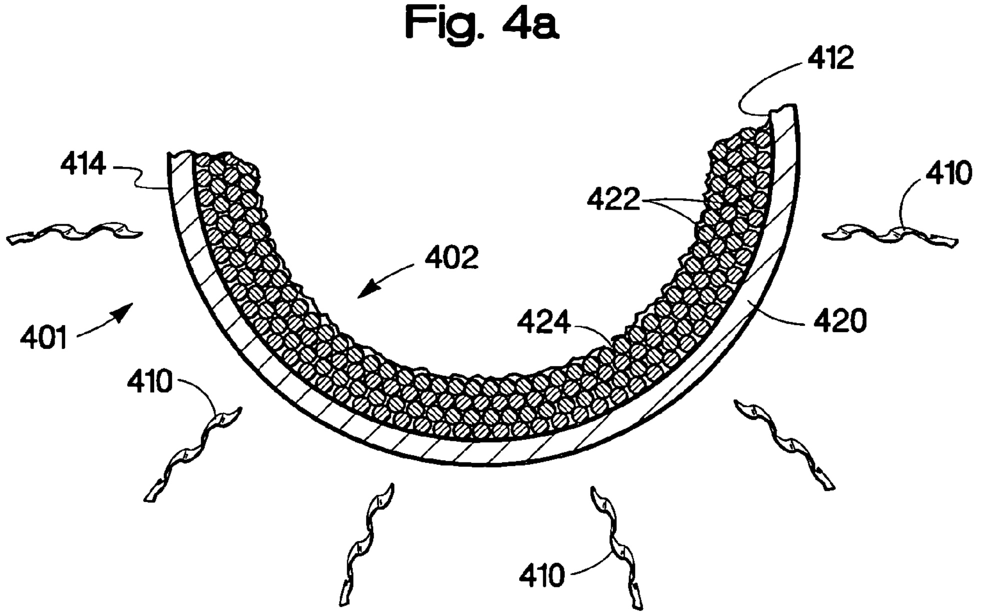
FIG. 4*b* is a cross-sectional view along 4*b*-4*b* of the incandescent source shown in FIG. 4*a*.

An alternate embodiment of the present invention is shown in a perspective view in FIG. 4*a*. In this embodiment, light bulb 401 includes multiple layers of spheres 422 disposed on internal surface 412 of substrate 420 as illustrated in a cross-sectional view in FIG. 4*b*. However, in alternate embodiments, the spheres also may be disposed on external surface 414. In this embodiment, the spheres form photonic crystal 402; however, in alternate embodiments, photonic crystal 402 may be formed utilizing an inverse opal structure where a second material is infiltrated into interstitial volume 424 between the spheres as previously described. In addition, in alternate embodiments an inverse opal structure may be formed on both the internal and external surfaces of substrate 420. Photonic crystal is tuned to yield a band gap in a desired spectral region in the infrared or visible region of the electromagnetic spectrum as represented by arrows 410. In one embodiment, photonic crystal 402 is tuned to pass visible light providing for an incandescent source having higher efficiency compared to conventional incandescent sources. In alternate embodiments, photonic crystal 402 may be tuned to pass infrared radiation in a desired region. Again providing higher efficiency compared to conventional sources. In addition, light bulb 401 also includes a filament (not shown) electrically attached to base 432. Base 432 as illustrated in FIG. 4 is depicted as a screw type base found on light bulbs commonly utilized in a home environment. However, it should be understood that this screw type base is shown for illustrative purposes only and that any type of conventional electrical connection and bulb sealing structure may be utilized in the present invention. A non-limitative example of an alternate base is those commonly found in projectors that include metal rods projecting through the base of the glass bulb and connected to the filament.

Figure 5:
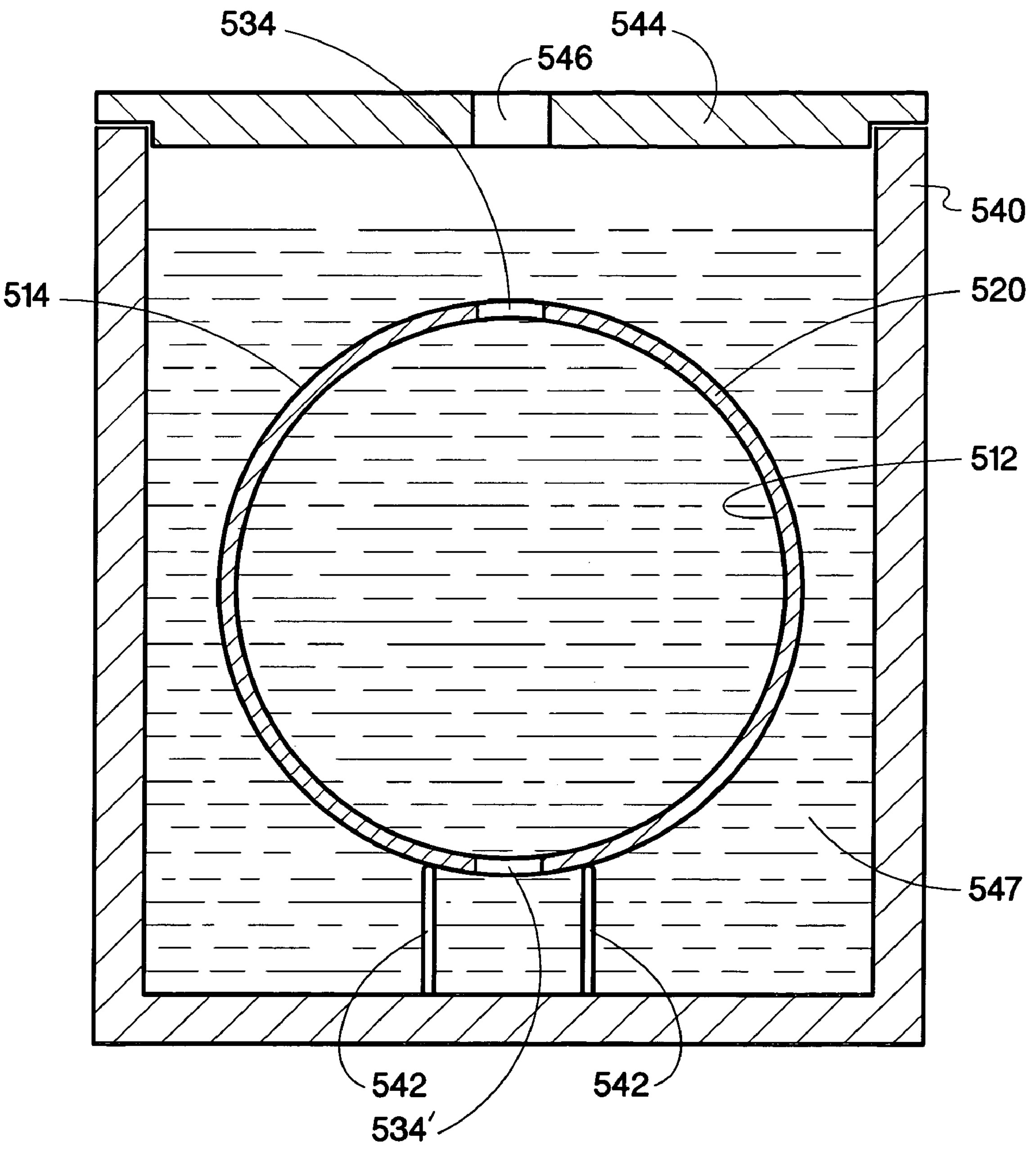
FIG. 5 is a cross-sectional view of a method of manufacturing a colloidal crystal on a spherically shaped substrate according to an embodiment of the present invention.

The colloidal crystals shown in FIGS. 1-4 may be formed by a variety of techniques. For example, sedimentation, and evaporation may be utilized to deposit monolayer and multilayer spheres on a substrate. An exemplary technique that may be utilized to form multilayer spheres on three-dimensional quadric surfaces is illustrated in FIG. 5. In this embodiment, substrate 520 is suspended, or immersed, or both in dispersion suspension 547 contained in container 540. In this embodiment, substrate 520 rests on four substrate holders 542. Generally, container 540 is immersed in a heating bath (not shown) held at a temperature just below the boiling point of the solvent used to form the colloidal dispersion solution. As the solvent evaporates and is drawn below the top of the substrate a meniscus forms at the intersection of the solution with both internal surface 512 and external surface 514 forming colloidal crystals on both the internal and external surfaces. As solvent is evaporated eventually the meniscus formed by dispersion solution 547 on internal surface 512 will drop below filament opening 534' ending the grow of the colloidal crystal on the internal surface of substrate 520. In alternate embodiments, a sacrificial layer (not shown) may be utilized to coat, for example, external surface 514 of substrate 520. After formation of the colloidal surface is complete the colloidal crystal formed on the external surface may be removed by utilizing an appropriate solvent that dissolves, etches, or removes, or combinations thereof, the sacrificial layer. For example, in the embodiment shown in FIG. 5, external surface 514 of substrate 520 may be coated with a polyamic acid solution which may be removed at a later time utilizing a solvent such as N,N-dimethylacetamide (DMAC) or N-methyl-2-pyrrolidone (NMP), or a strong basic solution such as potassium hydroxide (KOH). A wide variety of inorganic or organic sacrificial materials may be utilized such as paraffin, other waxy materials, and metals. The particular material chosen will depend on various factors such as the particular spheres, solvent, and temperature utilized to form the colloidal crystal. In this embodiment, the solvent vapors formed inside of substrate 520 may escape via filament opening 534 and ultimately expelled through lid opening 546 disposed in container lid 544. The solution includes a mixture of spheres and a solvent. For example the solution may include silica spheres or polymeric spheres, such as polystyrene, or combinations thereof suspended in an ethanol solvent. Generally, the volume fraction of spheres is in the range from about 1 percent to about 10 percent. A wide variety of solvents may be utilized such as water, ethanol, methanol, propanol, and hexanes. Depending on the size of spheres and the material utilized to form the spheres the evaporation may be carried out anywhere from room temperature up to just below the boiling point of the solvent. For example, for silica spheres having a diameter less than about 500 nanometers the solution may be evaporated at or near room temperature, whereas for silica spheres having a diameter greater than about 500 nanometers the solution may be evaporated at or near its boiling point. The thickness or number of layers of spheres deposited may be controlled by varying the speed of evaporation, the volume fraction of spheres in suspension, or combinations of both. In addition, thicker colloidal crystals also may be formed by carrying out multiple deposition cycles. To hinder the peeling off or partial redispersion of the previously deposited films during subsequent depositions it has been found to be advantageous to sinter the colloidal crystal. For example, in those embodiments utilizing silica spheres sintering may be carried out utilizing tetramethyl orthosilicate for several minutes at about 80° C. Another example is to heat silica spheres to about 600° C. to improve the structural integrity of the colloidal crystal without utilizing a sintering agent. In still other embodiments, other sintering agents, times, and temperatures also may be utilized. In addition, multilayer colloidal crystals having different colloidal sphere sizes may be formed utilizing multiple depositions. For example, AB, ABA, ABC multilayer crystals may be formed where the letters A, B, and C each represent at least one layer of spheres having a different sphere diameter from the other letters. In still other embodiments, multiple sized spheres also may be utilized in a single solution to generate, for example, binary $AB_2$ crystal structures. Further, the spheres of different sizes may be formed utilizing different materials have different dielectric constants generating a colloidal crystal having a spatially varying dielectric constant.

Figure 6:
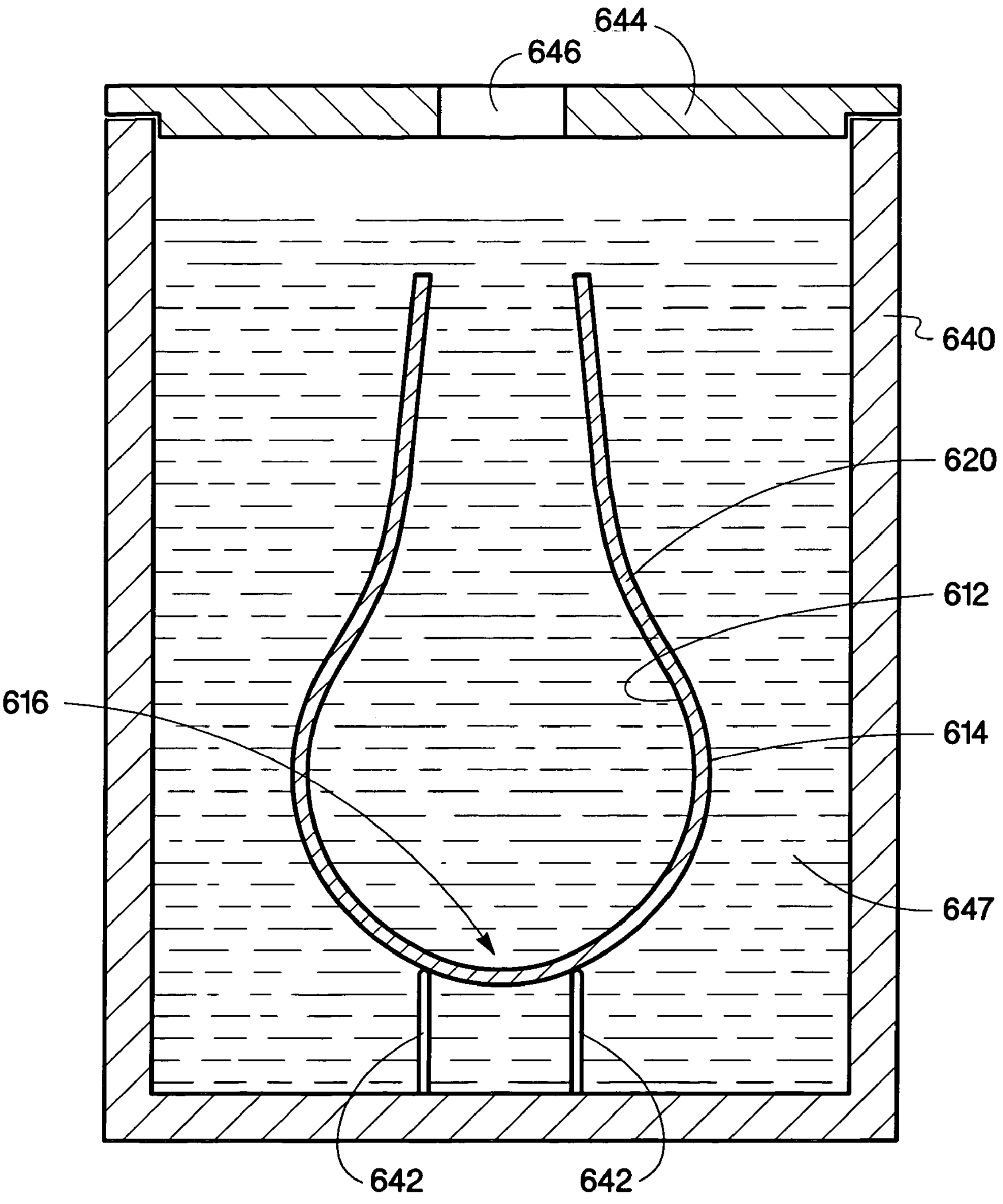
FIG. 6 is a cross-sectional view of a method of manufacturing a colloidal crystal on a bulb shaped substrate according to an alternate embodiment of the present invention.

An alternate embodiment that may be utilized to form multilayers of spheres on three-dimensional quadric or greater surfaces is shown in FIG. 6*a*. In this embodiment, substrate 620 is suspended, or immersed, or both in colloidal dispersion solution 647 contained in container 640. Substrate 620 rests on four substrate holders 642; however, in alternate embodiments a wide variety of substrate holder designs may be utilized, as well as the number of substrate holders may be varied. Generally container 640 is immersed in a heating bath held at a temperature anywhere from room temperature up to just below the boiling point of the solvent used to form colloidal dispersion solution 647. As the solvent evaporates it is drawn below the top of the substrate and a meniscus forms at the intersection of solution 647 with both internal surface 612 and external surface 614 forming colloidal crystals on both the internal and external surfaces. In this embodiment, substrate 620 does not include a hole or aperture in the vicinity of substrate holders 642 through which sediment may be expelled during the colloidal crystal growth process. Thus, the multilayers of spheres forming the colloidal crystal in sediment region 616 of substrate 620 will be both greater in number and will generally include a greater number of crystal defects than elsewhere on internal surface 612 of substrate 620. In alternate embodiments, a sacrificial layer (not shown) may be utilized to coat, for example, external surface 614 of substrate 620. In still another embodiment substrate 620 may be filled with the dispersion suspension and the solvent slowly evaporated on internal surface 612 thereby obviating the need to remove the spheres from outside or external surface 614. After formation of the colloidal crystal is complete, in the embodiment shown in FIG. 6, the colloidal crystal formed on the external surface may be removed by utilizing an appropriate solvent that dissolves, etches, or removes, or combinations thereof, the sacrificial layer. For example, in the embodiment shown in FIG. 6, external surface 614 of substrate 620 may be coated with a polyamic acid solution which may be removed at a later time utilizing a solvent such as N,N-dimethylacetamide (DMAC) or N-methyl-2-pyrrolidone (NMP), or a strong basic solution such as potassium hydroxide (KOH). A wide variety of inorganic or organic sacrificial materials may be utilized such as paraffin, other waxy materials, and metals. The particular material chosen will depend on various factors such as the particular spheres, solvent, and temperature utilized to form the colloidal crystal. In still other embodiments, substrate 620 may also include an aperture or hole in the vicinity of sediment region 616 in which case crystal growth will proceed as described for the embodiment describe above.

Figure 7A:
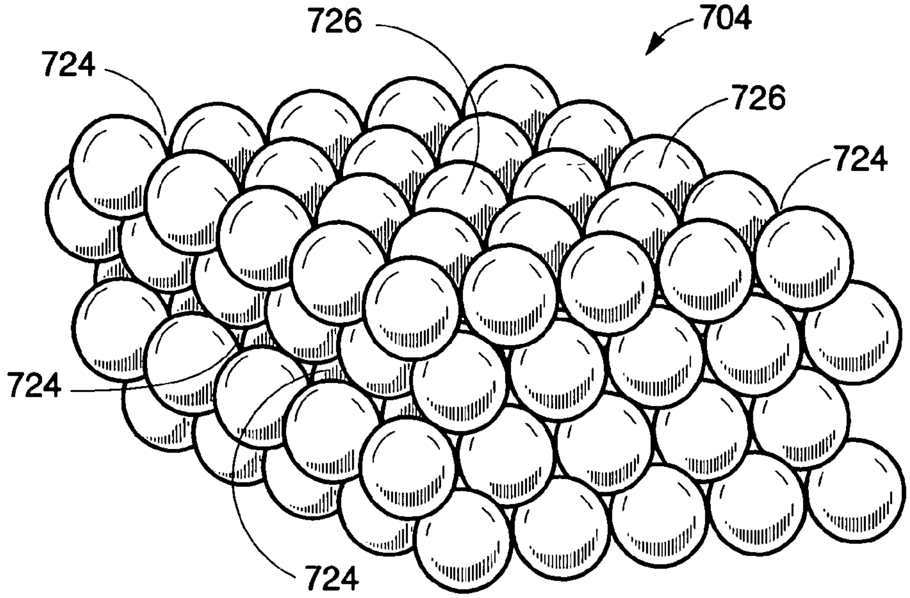
FIG. 7*a* is a perspective view of a portion of a colloidal crystal according to an embodiment of the present invention.
Figure 7B:
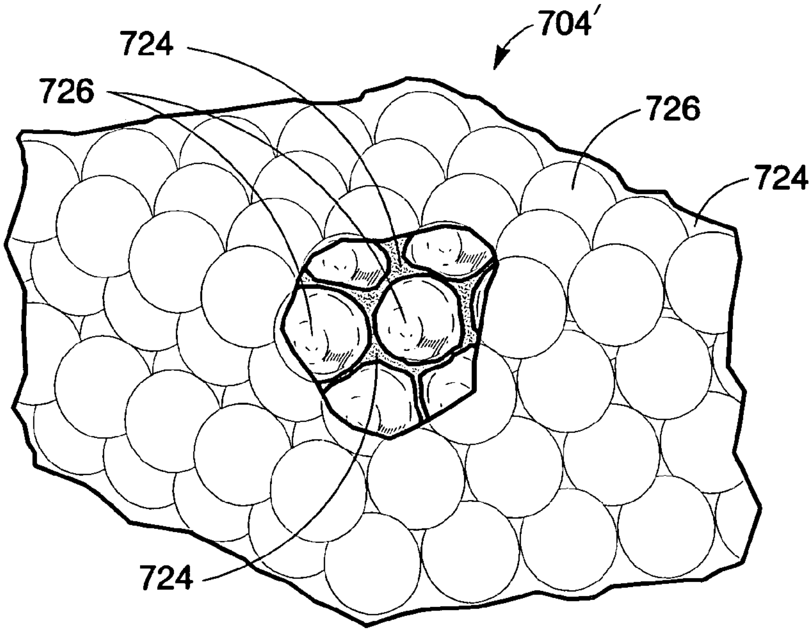
FIG. 7*b* is a perspective view of a portion of an inverse opal crystal according to an alternate embodiment of the present invention.

For those embodiments utilizing an inverse opal crystal structure a variety of deposition techniques may be utilized to fill the interstitial volume formed between the spheres such as atomic layer deposition (ALD), chemical vapor deposition (CVD), electro-deposition, and electroless deposition. An exemplary technique utilizes atomic layer deposition to fill or infiltrate the interstitial volume of the colloidal crystal. In one embodiment a tungsten inverse opal structure may be generated utilizing alternating exposures of the colloidal crystal to tungsten hexafluoride ($WF_6$) and silicon hydride (e.g. $SiH_4$, $Si_2H_6$, $Si_3H_8$ and mixtures of various silicon hydrides). The tungsten film growth may be achieved utilizing an alternating sequence of exposures of $WF_6$ and $Si_2H_6$ in the temperature range from about 100° C. to about 400° C. It is believed that the disilane reactant serves a sacrificial role to strip fluorine from tungsten limiting the incorporation of silicon into the film; however, the present invention is not limited to such a mechanism. In alternate embodiments, other silicon hydrides also may be utilized. In still other embodiments a wide range of inorganic materials also may be utilized. Tungsten nitride, titanium dioxide, and indium phosphide are just a few examples. After multiple exposures of the colloidal crystal to the reactants the interstitial volume in the crystal will be filled or substantially filled. The silica spheres may then be removed by soaking in a aqueous hydrofluoric acid solution (i.e. typically about 2 weight percent) to form inverse opal photonic crystal 704 as illustrated in FIG. 7*b*. FIGS. 7*a* and 7*b* illustrate the differences between a colloidal crystal and an inverse opal crystal. FIG. 7*a* represents a portion of colloidal crystal 704 which has a close-packed geometry, whether the structure is face-centered cubic, hexagonal close-packed or randomly stacked with each sphere 726 touching six other spheres in one layer. Interstitial volume 724 is the volume of the crystal not occupied by spheres 726. FIG. 7*b* represents a portion of an inverse opal photonic crystal 704 where interstitial volume 724 has been infiltrated or filled with an inorganic material and spheres 726 have been removed. The particular inorganic material utilized will depend on the particular application in which the photonic crystal is utilized. ALD provides an exemplary technique for thin film deposition in deep structures, complex structures, or both. In addition, ALD also provides control in the chemical composition of the deposited film by selection of various precursors, various deposition temperatures and pressures, and combinations of these parameters. Further, the generally low deposition rates (i.e. typically on the order of a few tenths of a nanometer per cycle) allows for a more uniform growth rate and more uniform thickness control in the narrow voids formed in the colloidal crystal providing a cost-effect process to fabricating photonic band gap structures.

What is claimed is:

1. An apparatus, comprising:

a substrate, having an internal surface wherein at least a portion of said internal surface having a smoothly varying curvature in three orthogonal directions, wherein said substrate further comprises an external surface and said internal surface is substantially conformal to said external surface, and wherein an external photonic crystal is disposed on said external surface; and a photonic crystal disposed over and conformal to at least a portion of said internal surface having said smoothly varying curvature.

2. An apparatus comprising:

a substrate having an internal surface wherein at least a portion of said internal surface having a smoothly varying curvature in three orthogonal directions; and a photonic crystal disposed over and conformal to at least a portion of said internal surface having said smoothly varying curvature, wherein said photonic crystal is a colloidal crystal, and said colloidal crystal further comprises a first layer having said plurality of first spheres, and an nth layer having said plurality of second spheres, wherein a is an integer greater than one.

3. The apparatus in accordance with claim 2, wherein said colloidal crystal further comprises a first layer having said plurality of first spheres alternating with a second layer having said plurality of second spheres.

4. The apparatus in accordance with claim 2, wherein said colloidal crystal further comprises:

a plurality of first spheres having a first diameter, and a plurality of second spheres having a second diameter.

5. The apparatus in accordance with claim 4, wherein said colloidal crystal further comprises a first group of layers having said plurality of first spheres alternating with a second group of layers having said plurality of second spheres.

6. The apparatus in accordance with claim 4, wherein said plurality of first spheres and said plurality of second spheres form a binary colloidal crystal.

7. The apparatus in accordance with claim 2, wherein said colloidal crystal further comprises metal spheres.

8. The apparatus in accordance with claim 2, wherein said colloidal crystal further comprises spheres having a differential solubility over an infiltration material.

9. The apparatus a accordance with claim 1, wherein said photonic crystal further comprises a photonic bandgap crystal.

10. The apparatus in accordance with claim 1, wherein said photonic crystal further comprises a spatially periodic structure.

11. An apparatus comprising:

a substrate, having an internal surface wherein at least a portion of said internal surface having a smoothly varying curvature in three orthogonal directions; and a photonic crystal disposed over and conformal to at least a portion of said internal surface having said smoothly varying curvature, wherein said photonic crystal further comprises an inverse opal crystal structure.

12. The apparatus in accordance with claim 11, wherein said inverse opal crystal structure includes a refractory metal.

13. The apparatus in accordance with claim 1, wherein said internal surface having a smoothly varying curvature further comprises a substantially spherically shaped internal surface.

14. The apparatus in accordance with claim 13, further comprising a wire filament, wherein at least a portion of said wire filament is disposed within said substantially spherically shaped surface.

15. The apparatus in accordance with claim 14, wherein said wire filament further comprises a spindly wound wire filament.

16. The apparatus in accordance with claim 13, wherein said substrate further comprises filament openings.

17. The apparatus in accordance with claim 16, wherein said wire filament further comprises a refractory metal wire.

18. The apparatus in accordance with claim 1, wherein said substrate further comprises said substrata formed in a bulbous structure wherein said internal surface is substantially conformal to a bulbous external substrate surface.

19. The apparatus in accordance with claim 18, further comprising an external photonic crystal disposed on said bulbous external substrate surface.

20. The apparatus in accordance with claim 18, wherein said substrate is substantially optically transparent in the visible portion of the electromagnetic spectrum.

21. The apparatus in accordance with claim 1, wherein said internal surface further comprises a hemispherically shaped internal surface.

22. The apparatus in accordance with claim 1, wherein said internal surface further comprises a parabolically shaped internal surface.

23. The apparatus in accordance with claim 1, wherein said internal surface further comprises an elliptically shaped internal surface.

24. A method of manufacturing an apparatus, comprising:

forming multiple layers of spheres over an internal surface having a smoothly varying curvature, wherein said multiple layers of spheres is conformal to said internal surface having said smoothly varying curvature, wherein said multiple layers include void spaces between said spheres.

25. The method in accordance with claim 24 further comprising forming a second material in said void spaces.

26. The method in accordance with claim 25, further comprising substantially filling said void spaces with said second material.

27. The method in accordance with claim 26, further comprising removing said spheres to form an inverse opal crystal.

28. The method in accordance with claim 25, wherein said spheres have a sphere dielectric constant and said second material has a dielectric constant different from said sphere dielectric constant.

29. The method in accordance with claim 24, further comprising immersing said internal surface having said smoothly varying curvature in a mixture of spheres and a solvent.

30. The method in accordance with claim 24, further comprising suspending said internal surface having said smoothly varying curvature in a mixture of spheres and a solvent.

31. The method in accordance with claim 24, further comprising cleaning said internal surface having said smoothly varying curvature.

32. The method in accordance with claim 24, wherein forming multiple layers of spheres further comprises forming multiple layers of spheres utilizing a mixture of spheres in a solvent.

33. The method in accordance with claim 32, further comprising removing said solvent.

34. The method in accordance with claim 33, wherein removing said solvent further comprises evaporating said solvent.

35. The method in accordance with claim 24, further comprising forming a sacrificial layer over at least a portion of said substrate.

36. The method in accordance with claim 35, further comprising removing said sacrificial layer.

37. A method of using a photonic crystal, comprising:

transmitting at least a portion of the electromagnetic spectrum through an internal surface of a photonic crystal, said internal surface having a smoothly varying curvature in three orthogonal directions, and said photonic crystal is disposed over and conformal to at least a portion of said internal surface having said smoothly varying curvature, and said photonic crystal comprises a spatially periodic structure; and heating an incandescent filament, whereby light generated from said incandescent filament is said at least a portion of the electromagnetic spectrum transmitted through said internal surface of said photonic crystal and a substantial fraction of the at least a portion of the electromagnetic spectrum transmitted through the internal surface is visible light.

38. The method in accordance with claim 37, wherein at least a portion of the photonic crystal encircles said incandescent filament.

39. The method in accordance with claim 38, wherein said incandescent filament includes a refractory metal.

40. The method in accordance with claim 37, wherein the photonic crystal further comprises the photonic crystal having a bulbous shape.

41. The method in accordance with claim 40, wherein said incandescent filament is disposed within said bulbous shaped photonic crystal, whereby said light generated from said incandescent filament is transmitted through said bulbous shaped photonic crystal.

42. The method in accordance with claim 38, wherein the photonic crystal further comprises a substantially spherically shaped photonic crystal.

43. The method in accordance with claim 42, whereby said light generated from said incandescent filament is transmitted through said substantially spherically shaped photonic crystal.

44. An apparatus, comprising:

a substrate, having an internal surface wherein at least a portion of said internal surface having a smoothly varying curvature in three orthogonal directions; and means for forming a photonic crystal disposed over and substantially conformal to at least a portion of said internal surface having said smoothly varying curvature, wherein said photonic crystal comprises a colloidal crystal, and said colloidal crystal further comprises a first layer having said plurality of first spheres, and an nth layer having said plurality of second spheres, wherein n is an integer greater than one.

45. The apparatus in accordance with claim 44, wherein said means for forming said photonic crystal further comprises forming a colloidal crystal.

46. The apparatus in accordance with claim 44, wherein said means for forming said photonic crystal further comprises forming a photonic bandgap crystal.

47. An apparatus in comprising:

a substrate, having an internal surface wherein at least a portion of said internal surface having a smoothly varying curvature in three orthogonal directions; and means for forming a photonic crystal disposed over and substantially conformal to at least a portion of said internal surface having said smoothly varying curvature, wherein said means for forming said photonic crystal further comprises forming an inverse opal crystal.

48. An apparatus, comprising:

a substrate, having an internal surface wherein at least a portion of said internal surface forms a three-dimensional quadric surface; and a photonic crystal disposed over and conformal to at least a portion of said three-dimensional quadric surface, wherein said photonic crystal is a colloidal crystal, and said colloidal crystal further comprises a first layer having said plurality of first spheres, and an nth layer having said plurality of second spheres, wherein n is an integer greater than one.

49. An apparatus, comprising:

a substrate, having an internal surface wherein at least a portion of said internal surface forms a three-dimensional quadric surface; and a photonic crystal disposed over and conformal to at least a portion of said three-dimensional quadric surface, wherein said photonic crystal comprises an inverse opal crystal.

* * * * *

UNITED STATES PATENT AND TRADEMARK OFFICE

CERTIFICATE OF CORRECTION

PATENT NO. : 7,394,587 B2 
APPLICATION NO. : 11/046587
DATED : July 1, 2008
INVENTOR(S) : Herbert Thomas Etheridge, III et al.

It is certified that error appears in the above-identified patent and that said Letters Patent is hereby corrected as shown below:

In column 9, line 14, in Claim 2, after “substrate” insert -- , --.

In column 9, line 23, in Claim 2, after “wherein” delete “a” and insert -- n --, therefor.

In column 9, line 31, in Claim 4, after “diameter” delete “,” and insert -- ; --, therefor.

In column 9, line 45, in Claim 9, after “apparatus” delete “a” and insert -- in --, therefor.

In column 10, line 2, in Claim 15, delete “spindly” and insert -- spirally --, therefor.

In column 10, line 9, in Claim 18, delete “substrata” and insert -- substrate --, therefor.

In column 12, line 13, in Claim 47, after “apparatus” delete “in”.

Signed and Sealed this

Eleventh Day of November, 2008

JON W. DUDAS
*Director of the United States Patent and Trademark Office*